EQUALIZED LINE AMPLIFICATION SYSTEM

Filed March 17, 1954 2 Sheets-Sheet 1

INVENTORS
Henry M. Diambra & George G. Edlen
BY Max L. Libman
Attorney

EQUALIZED LINE AMPLIFICATION SYSTEM

Filed March 17, 1954 2 Sheets-Sheet 2

INVENTORS
Henry M. Diambra & George G. Edlen
BY Max L. Libman
Attorney 2,863,006
Patented Dec. 2, 1958

2,863,006

EQUALIZED LINE AMPLIFICATION SYSTEM

Henry M. Diambra, Washington, D. C., and George G. Edlen, Silver Spring, Md., assignors, by mesne assignments, to Citizens Bank of Maryland, Riverdale, Md., and Small Business Administration, Richmond, Va.

Application March 17, 1954, Serial No. 416,836

8 Claims. (Cl. 179—171)

This invention relates to closed circuit distribution systems such as are used with community antenna systems for distributing a signal from a single point to a large number of utilization devices such as television receiving sets over a closed distribution network usually of coaxial cable conductors.

In a typical community antenna system the signal is received at a suitable location, usually a tower erected on a nearby hill or similar location providing good line-of-sight to television transmission stations which are within range. The transmission frequencies of the received signals from several stations are preferably converted to more suitable frequencies for closed circuit distribution, both to spread adjacent channels and to reduce the highest frequency signals to lower frequencies which can be transmitted along cables with less loss and attenuation, all of which is well-known in the art. However, as there is inevitably attenuation of the signals in the cables, and as long lengths of cable are usually needed in a typical system, it is necessary to insert an amplifier in the line after the signal has transversed a certain length of cable, the length depending on the type of cable, initial signal strength, etc. In designing a particular system, the various factors are sought to be so controlled as to give satisfactory performance at the lowest possible overall cost. A practical compromise, for example, is to insert an amplifier at each point in the line where the signal has been attenuated approximately 38 db and to amplify the signal by that amount. In such a system, a standard transmission line unit may be considered as a length of cable having an attenuation in the transmission range of 38 db at the highest frequency being transmitted, and an amplifier which will raise the signal to its original input level. The length of cable in such a unit depends, of course, upon the size and type of cable and may vary widely with these factors, for example, 2,000 feet of RG–11 or 1,000 feet of RG–59 may comprise such a unit.

Since the attenuation in the cable is higher for high frequencies than for low frequencies, it will be apparent that if signals of equal amplitude are fed to a unit length of cable (say, 2,000 feet of RG–11 at, say, 50 megacycles and at 90 megacycles, the 50 megacycle signal will be attenuated only 28 db while the 90 megacycle signal will be attenuated 38 db. Since in a typical installation several units of this line will be required, and in each unit the same relative attenuation will occur, it is apparent that without frequency equalization, the output signals at the end will be badly unbalanced. It is therefore necessary to provide frequency equalization for each unit. This may be done in different ways, e. g., a passive attenuating network may be inserted in the line which will attenuate the lows sufficiently more than the highs to level off the output frequency characteristic. This is obviously inefficient. Separate channel amplifiers may be used for each frequency channel and its amplification adjusted to produce the desired gain. Or, more simply, an amplifier having a band sufficiently wide to embrace the entire chain may be designed with a frequency tilt favoring the higher frequencies to compensate for the cable frequency characteristic. This last solution is attractive because of its apparent simplicity, but in practice a number of difficulties appear. In the first place, it is desirable to have the amplifier useful with more than one specific type of cable, so as to avoid having a multiplicity of amplifier types, which means that the tilt should be made variable. To design a wide-pass amplifier of this sort is a difficult problem, and the solution is complicated and expensive, and therefore not economical. Since these systems compete directly on a cost basis, it is apparent that the economic factor is an essential one and cannot be ignored.

A very satisfactory type of broad-band amplifier for transmission line use is the distributed amplifier of the general type described by Ginzton et al. in a paper entitled "Distributed Amplification," published in Proceedings of the IRE, August 1948. However, this amplifier, in the form shown, does not provide a solution to the problem outlined above. As indicated in the IRE paper, a simple distribution amplifier of the type shown will have a gain which is a rising function of frequency and it is suggested that by partly compensating this function, the degree of rise can be controlled so as to compensate for the frequency characteristic of a transmission line. This solution is expensive of tubes and provides a fixed tilt for each amplifier design to that for each type of condition of cable a different amplifier design would be needed. In practice, it is found that not only do different types of cable have different frequency characteristics, but even the same cable type will differ from length to length because of non-uniformities of construction, particularly with respect to the loose weave of the outer braided conductor. A satisfactory practical solution therefore requires an amplifier which can be used with different lines and which can be readily and efficiently adjusted to provide correct utilization for a number of different frequencies corresponding to different television channels transmitted by cable. It is therefore an object of the invention to provide such a solution in a compact and economic unit of stable design.

It is a primary object of our invention to provide a system embodying an optimum length of transmission line and a particular construction and circuitry for a distributed amplifier which provides a complete solution to the problem of transmitting a number of different frequency channels (e. g., from 50–90 megacycles) over a long transmission line with uniform gain for all frequencies, and, what is equally important, substantially uniform signal-to-noise ratio for all of the transmitted channels, so that a clean, clear, useful television signal is received by the user at all points on the line.

As described in the IRE paper, for optimum design the tubes of the distributed amplifier must be divided into a number of groups or stages, each having a minimum gain of $e$ (2.718). According to the invention, it will be shown that the optimum frequency compensation or equalization for a line can be obtained only if there is a certain definite relationship of the frequency characteristics of each such stage to that of the other stages.

More specifically, it is an object of the invention to provide a line unit consisting of a distributed amplifier and a length of coaxial cable having a transmission frequency characteristic limited to a relatively small number of adjacent channels and correctly compensated for the frequencies of these channels.

Another object is the provision of a distributed amplifier having a number of separate stages for coaxial transmission lines wherein the separate stages of the amplifier are substantially identical, and wherein the slope of the frequency characteristic of the amplifier is successively increased in the respective stages so as to maintain an optimum signal-to-noise ratio.

Still another object is to provide a coupling filter or matching section between the amplifier and the line which is readily adjustable in the field for a wide range of cable characteristics, so as to provide an optimum match between the amplifier and its line section on all channels which are being transmitted.

The specific nature of the invention, as well as other objects and advantages thereof, will clearly appear from a description of a preferred embodiment as shown in the accompanying drawings, in which.

Figures 1, 4:
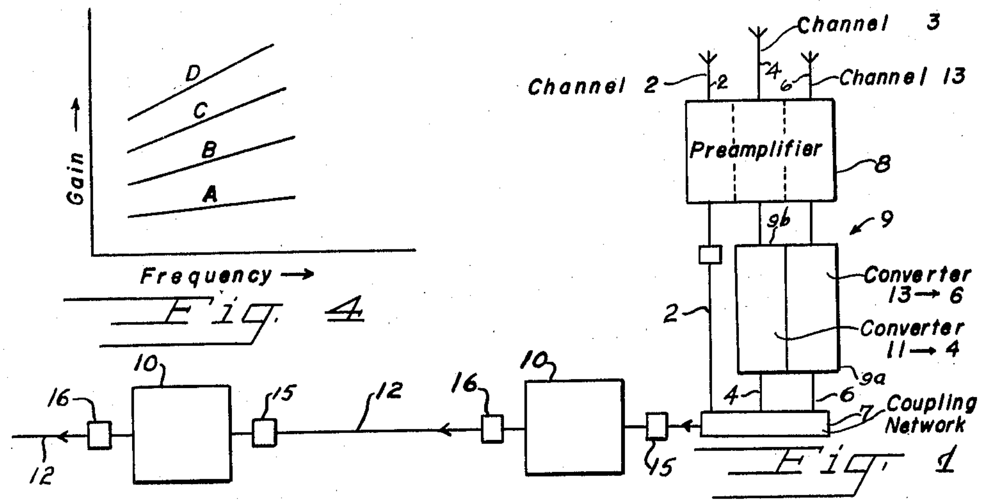
Fig. 1 is a schematic diagram of the elements of a community antenna system using the invention.
Fig. 4 is a graph showing the increase of the frequency characteristic tilt in each stage of a distributed amplifier according to the invention.
Figure 2:
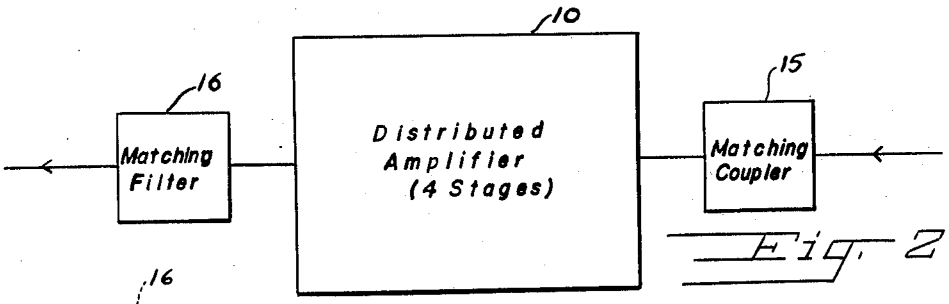
Fig. 2 is a schematic diagram of a line unit according to the invention.

Fig. 1 shows a typical community antenna installation in which the invention is particularly useful. Receiving antennas 2, 4 and 6 are mounted at a high location, usually on a tower located on a hill near the community to be served. Assuming, by way of example, that channels 2, 3 and 13 can be received from nearby city transmitters at this location, the received signals are first amplified by a suitable preamplifier 8, which is indicated schematically and is no part of the present invention. Since it would be expensive to distribute television signals at the high frequency of channel 13, due to the high attenuation in the cable at these frequencies, this frequency is then converted in known fashion to a lower frequency signal by heterodyning in converter **9*a*, for example, to channel 6. In similar fashion, channel 3 frequency is converted at 9*b* to that of channel 4. This means, of course, that when the user dials channel 4 on his set, he will receive channel 3, and when he dials channel 6, he will receive channel 13. This frequency conversion is used both to reduce a high frequency signal to a lower frequency (e. g., channel 13 to channel 6) which is more economical to distribute and also to spread to adjacent frequencies (channels 2 and 3) so as to reduce interference between them and so simplify the transmission problems. The converted signals are now fed to the line 12 through any suitable coupling network 7**.

The converted signals are now amplified by amplifier 10 and the output levels equalized so that the three channels fed into the line are of substantially equal amplitude. The problem is to keep them at equal amplitudes along the transmission line. As previously explained, the signals are attenuated as they traverse the line 12, and at each point where the weakest signal has dropped 30 db, the signals are reamplified to their original level by means of amplifiers 10, which are matched to the line at the input end by matching transformer 15 and are provided at the output end with adjustable matching filters 16 as will be more fully explained below. Since the higher frequency signal (channel 6) is attenuated much more than the lowest frequency signal, it is obviously necessary to provide equalization of the various signals. Since separate channel amplifiers are not used in our system, which uses instead distributed amplifiers 10 which pass the entire range or band of signals from the selected channels, e. g., from 50 megacycles to 90 megacycles, the problem is to provide the necessary equalization in the most effective and economical form and, at the same time, to perfectly match the amplifier to the individual characteristics of the length of distribution line or cable with which it is associated. This is accomplished in the following fashion.

Figure 3:
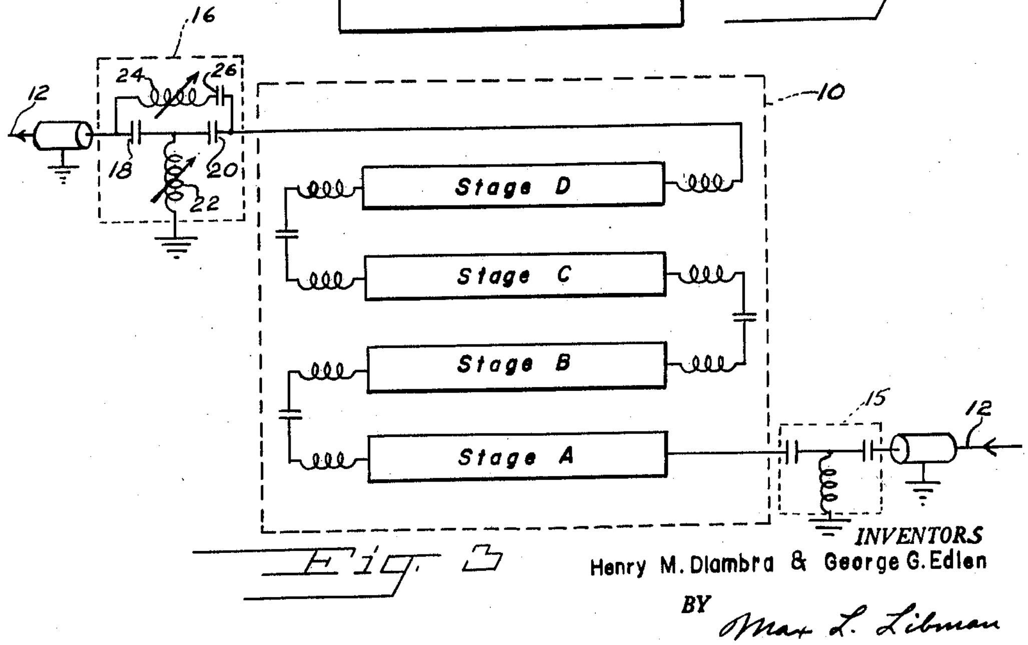
Fig. 3 is a circuit diagram of the distributed amplifier with input and output matching filters.

As previously explained, considerations of economy and efficient use of the tubes of the distributed amplifier require, for a given gain, a number of stages, each having a gain of *e* (2.718). A practical design for this purpose may, for example, have four such stages. In Fig. 3, the amplifier 10 has four such stages, respectively indicated as A, B, C, and D. We prefer to make the stages alike, for practical reasons. In view of the fact that the input signal to the first stage is much lower than that to the last stage, it is desirable to have the slope of the frequency characteristic of the first stage much more nearly flat (i. e., less "tilt") than that of the last stage. The reason for this will be given below.

The signal going into the amplifier is of relatively low level (1 to 1.5 mv.). It is desirable to maintain the same signal-to-noise ratio throughout the channels being amplified and therefore it is desirable to have a high power gain nearly uniformly throughout this band in the early stages of the amplifier, since even with a high gain, the weak signals which reach these stages will not be amplified to the point of intermodulation between the respective channels, but will maintain their initial high signal-to-noise ratio after amplification. In practice, much of the disturbing noise generated in the length of cable with which the amplifier is associated is man-made noise, superimposed on the random or thermal noise which is always present. This man-made noise may be, for example, automobile static, corona discharges of nearby power lines, electrical equipment noises, etc., which due to imperfections in the shield construction of the cable are picked up. These man-made noises are concentrated more in the lower frequencies and so affect the lower channels more than the higher channels. If the higher channels were favored immediately in the amplifier, e. g., in the first bank, sufficiently to equalize for the attenuation of the line, the lower frequency channels would still be in the high noise region. It is therefore desirable to initially amplify the low channels sufficiently so that later, when the low signal must be more discriminated against, its amplitude will be sufficiently well above the noise amplitude so that the signal is not appreciably deteriorated. It must be remembered that the amplifier, too, generates a certain amount of inherent noise at each stage, and if the highs are amplified too much out of proportion at the early stages, the signal-to-noise ratio for the loss would be relatively deteriorated. By amplifying the highs and lows almost alike in the first bank, the relative signal-to-noise ratio is sufficiently equalized for low and for high channels so that subsequent "tilting" of the frequency characteristic can now be accomplished without appreciable signal deterioration.

Note that the attenuation at the high channel frequency determines the maximum length of cable in each unit. The system must therefore be designed for a certain gain at this frequency. To get the maximum output without intermodulation, the remaining gain of the system must be apportioned to the other channels in successively diminished amounts, yet these amounts must be sufficient to transmit a good signal on each channel. It will be seen that these requirements are quite rigorous, since they must be met with an absolute minimum number of tubes for competitive economy, since the cost of a community antenna system for a fair-sized town such as is often served, is very great, and a very small percentage change in cost means a very large percentage change in the number of subscribers using the system.

The amplifier must be able to pass a composite signal carrying (in a practical application) up to five channels in one pass band, so that the signal of channel 6 (assumed to be the highest) must be approximately between $\frac{2}{10}$ and $\frac{4}{10}$ volt, without intermodulation. We accomplish this in optimum fashion by progressively tilting each stage of the amplifier so as to be able to pass higher and higher peak voltages without intermodulation, since the lower channels are progressively cut down in amplitude relative to the higher channels to the point where the last stage delivers a much higher signal on the high channels than on the low, but the intermodulation remains the same throughout because the peak-to-peak value of the composite voltage for all frequencies remains the same due to this progressive change in the distribution or tilt of the frequency characteristic.

This is shown in Fig. 4, where the curve A represents the tilt of the frequency characteristic of the output of stage A, while curves B, C, and D show the progressive tilts of the outputs of stages B, C, and D of Fig. 3, respectively.

Prior art design of an amplifier for community antenna system transmission has provided a very broad-band amplifier and used passive equalization. This is both expensive to build, since higher band width can be purchased only at the expense of gain, and also has the dual disadvantage of introducing more of the low-frequency man-made noises previously discussed, at the low end, while at the high end there is very great attenuation of the signal. To minimize these undesirable effects, we provide, in conjunction with our improved amplifier, a matching filter section which serves, in effect, both as a transformer and as a filter, i. e., it matches the 330 ohm plate line impedance to the 72 ohm coaxial cable specifically over the range of frequencies to be passed, typically 50–90 megacycles. Moreover, by two simple adjustments which can be made in the field after the equipment is installed, the amplifier output can be readily matched to the cable over this entire frequency range. Since the matching point of the cable at the high frequency is fixed by virtue of the fact that the maximum attenuation occurs at this frequency, we provide for a final slight adjustment or tilting of the output characteristic about the high end as a hinge point, so that after the high end is matched, the low end can be shifted more or less about this high end as a pivot point to secure an optimum match at the low end, as required for each length of cable. Moreover, a bend can be put into the matching filter characteristic to match more closely the characteristic at the intermediate channels. This is accomplished by filter 16, which is a type of modified bridge-T filter consisting of capacitors 18 and 20 which may be of $12^{\mathrm{mmfd.}}$ capacity, and variable inductor 22, the capacitors 18 being shunted by the series resonant combination of variable inductor 24 and capacitor 26, the resonant frequency of which is, of course, not in the band-pass range of the system, so that 22 and 24 comprise a further slight tilt-varying means adjusted by varying the value of the inductor 24 to adjust for channels 2—4, e. g., while inductor 22 can be adjusted to provide a correct match for channels 4—6. Actually, since both inductors affect the whole range to some extent, it is advisable to manipulate them both simultaneously. By this simple means we provide a matching filter which can readily adjust the output characteristic of the amplifier to produce clear, brilliant television reception on all of the transmitted channels, it being only necessary to use a wide band sweep generator for an input signal and note the output on a suitably calibrated oscilloscope circuit as the inductor slugs are adjusted until the output characteristic is flat as viewed through 2,000 feet of cable. In practical installations it has proved readily possible to equalize within ½ db from 50–90 megacycles with this system.

Figure 5:
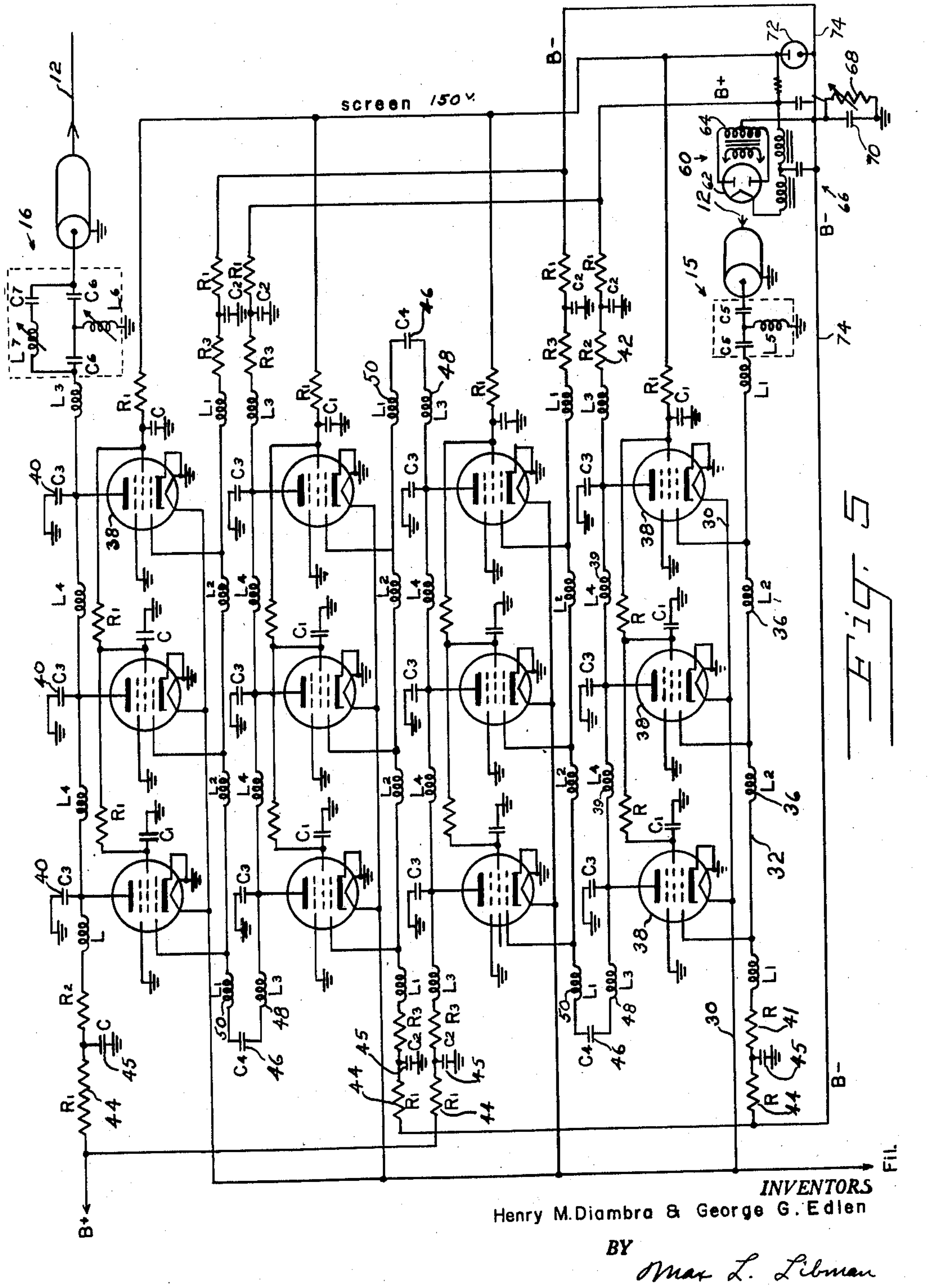
Fig. 5 is a detailed circuit of a typical amplifier according to the invention.

Fig. 5 shows the circuit details of a typical amplifier according to the invention. In the drawing, the letter-digit reference characters are used to indicate the electrical value of the component, but to identify specific components a number only is used. The incoming signal from line 12 is received through a conventional impedance matching network 15 on the grid line 32 of the first stage (stage A), which is a typical distributed amplifier stage, the grid-cathode capacitance being in practice that of the filament bus 30 which runs so close to ground that the distributed capacity of this bus is sufficient bypass in the frequency range with which we are concerned (50–90 megacycles). The usual inductances L2 between tubes 38 are provided in the grid line and another set of plate line intertube inductances 39 (L4), provided with shunt capacitors C3, constitute the basic distributed amplifier stage. The grid line 32 is terminated in resistor 41 (R3) having a value equal to its characteristic impedance of 195 ohms. In practice, it has been found better to use two 390 ohm resistors in parallel, rather than one 195 ohm resistor, since such a double unit affords, by the way the resistors are connected, a reduced effective inductance and an improved distribution of capacity so that the unit looks more like a pure resistor in the working frequency range than does a single half-watt resistor. A similar arrangement is also used on the plate line at 42, where the further consideration of energy dissipation is also important since the plate line carries appreciable power. A decoupling resistor 44 (R1) is used to complete the connection of the grid line to the B— supply voltage, which is a regulated supply as will be described below. Condenser 45 is a bypass condenser of sufficient capacity to provide a substantial high-frequency short-circuit to ground at the end of the grid line.

A list of typical values of electrical components is given below, although it will, of course, be understood that these values are only exemplary and not limiting:

| | | Ohms |
|---|---|---|
| R1 | | 10 |
| R2 | | 310 |
| R3 | | 195 |
| C1 | microfarad | .005 |
| C2 | do | .005 |
| C3 | micromicrofarad | 3.0 |
| C4 | do | 100 |
| C5 | do | 22 |
| C6 | do | 12 |
| C7 | do | 100 |
| | | Microhenrys |
| L1 | | .23 |
| L2 | | .50 |
| L3 | | .35 |
| L4 | | .70 |
| L5 | | .32 |
| L6 | | .22.–33 |
| L7 | | 1.96–3.16 |

All tubes are 6AH6V type.

The values given in Fig. 5 are typical values for a practical amplifier made according to the invention. It will be noted that the grid line is made purposely flat and is not involved in the tilting action. The plate line, however, is tilted as to frequency characteristic by making its coupling capacitor 46 of sufficient value so that it favors the high frequencies more than the low—for our frequency range a value of 100 micromicrofarad is suitable. In the practical circuit of Fig. 5, the grid line impedance is 190 ohms, while the plate line impedance is 310 ohms, and the coupling provided between the two at this point is deliberately slightly mismatched at the low frequency end. The inductances 48 and 50 are selected to allow the plate and grid lines respectively each to look into an inductance value almost equivalent to its characteristic at the high frequencies, while the intentional mismatch at the low frequencies provides the desired frequency "tilt." The tilt for each stage is, of course, very small, but since it is multiplied by the tilt for the succeeding stage, the final tilt has been increased to a value just below that which is needed for the final matching of the line characteristic. Now it must be remembered that this has been done by keeping the high frequency end up and successively "knocking down" or discriminating against the low end. This is desirable because the transmission of signals on the associated line section is limited by its ability to pass high frequencies, that is, the attenuation at the high frequency end is, as previously explained, some 10 db worse than at the low end. Therefore, the line and amplifier are matched at the high end and the final adjustment to secure correct matching along the entire frequency range is accomplished by further adjustment of the low frequency end, that is, by mismatching still further at the low end about the high end as a kind of pivot or hinge point. This is done by means of matching network 16, as has been explained.

The above described amplifier must possess a relatively constant gain even if the input voltage to the amplifier is not constant, since the system would be badly unbalanced if the amplifier gain varied as the line voltage supplied to the amplifier. Since in practice the line voltage usually varies with the overall line load, which means that there is a daily cycle of variation, it is found necessary in practice to provide means to compensate for these variations so as to maintain the gain constant within approximately 1 db over a voltage range from 100–125 volts.

Normally, in the circuit shown, the gain of the amplifier would rise as the filament voltage rises, due to increased filament emission, the slight change in plate voltage being relatively unimportant due to the plate characteristic. In order to compensate for this, a change is bias is provided with change in line voltage as will be described below.

The amplifier power supply 60 includes a conventional arrangement of rectifier 62, transformer 64, and filter 66. Instead of returning the power supply to ground, it is grounded through adjustable resistor or potentiometer 68, which is provided with the usual high frequency bypass condenser 70. The screen voltage (shown at 150 volts) is regulated by means of a gas tube regulator 72, for example type OD3 tube, all of the B voltages including the screen voltage being returned not to ground but to line 74, which is held below the chassis ground by means of resistor 68 by an amount equal to the B— bias. As the line voltage increases, the amount of voltage on the plates would normally rise, also the rising cathode temperature will cause an increasing emission, etc. However, the increase to conduction causes a corresponding increase in current flow and a corresponding increase in the bias developed across resistor 68. This increase in bias tends to reduce tube conduction so that in practice a dynamic balance is readily achieved by this compensating circuit within ±1 db over a line voltage variation from 105–125 volts. Thus, by the addition of the simple and inexpensive means shown to the conventional power supply, adequate compensation is achieved in the normal range of line variation.

It will be seen that the above described system provides a complete matched line unit comprising an amplifier and an optimum length of line, the two being perfectly balanced for correct transmission over a desired frequency range, and provided with means for facilitating rapid installation and correct adjustment for each unit as it is installed. Correct operation of such a unit is essential to the sucess of a television community antenna system—economy of cost is almost equally essential, while adjustability of the unit to different local conditions in another practical necessity. All of these are provided very successfully by the system described, which fulfills all of the objects of the invention.

It will be apparent that the embodiments shown are only exemplary and that various modifications can be made in construction and arrangement within the scope of our invention as defined in the appended claims.

We claim:

1. A line unit for transmission of a restricted band of high frequency signals comprising a length of signal transmission and distribution line having a frequency attenuation characteristic decreasing with respect to frequency over said restricted band, an amplifier connected to one end of said line and comprising a plurality of cascaded amplifier stages more than two in number, each stage comprising a distributed amplifier having a grid artificial transmission input line and a matched plate artificial transmission output line; said amplifier having an overall frequency-gain characteristic inversely corresponding to the frequency-attenuation characteristic of said length of line; coupling means connecting the plate line of each stage to the grid line of a succeeding stage, said coupling means comprising means matching said respective plate and grid lines at the high frequency end of said restricted band and having a progressively greater mismatch toward the low frequency end of said band for each stage, whereby the frequency characteristic of each stage output is substantially the same at the high frequency end, but is progressively lower than the preceding stage at the low frequency end.

2. The invention according to claim 1, each said coupling means comprising a series L–C circuit, the inductance of which has a value such that at the high frequency end of said band it is better matched to the characteristic impedance of the associated lines than at the low end.

3. The invention according to claim 2, each said L–C circuit comprising two inductances and an intermediate capacitor, said capacitor being of a value to freely pass signals at the high-frequency end of said band and to progressively attenuate signals toward the low-frequency end of said band, the values being such that the frequency "tilt" thereby produced is very slight in the first stage and successively increases in each stage, the "tilt" of the last stage being insufficient to fully compensate for the corresponding opposite attentuation tilt of the associated transmission line length.

4. The invention according to claim 3, and a matching filter section connected to the plate line output of the last stage of the amplifier, said filter section having no substantial attenuation at the high end of said band and means for selectively adjusting the attenuation of said filter section at selected points toward the low end of said band to complete the frequency compensation of said entire line unit.

5. A line unit for transmission of high-frequency signals over a restricted band of frequencies, comprising a series of distributed amplifier units, connected to each other by lengths of transmission line each comprising a section, each said line section having an attenuation characteristic corresponding inversely to the gain characteristic of an associated one of said amplifier units, whereby the gain frequency characteristic of each said amplifier is matched to the attenuation frequency of said associated line section; each said distributed amplifier having a plurality of cascaded stages, each stage being a distributed amplifier section having a plate line and a grid line, means connecting the plate line output of each section to the grid line input of the succeeding section, said connecting means comprising means matching said two lines at the high-frequency end of said restricted band and having a progressively greater mismatch toward the low-frequency end of said band for each stage, whereby the frequency characteristic of each stage output is substantially the same at the high frequency end, but is progressively lower than the preceding stage at the low frequency end.

6. The invention according to claim 5, and a bridge-T matching filter section connecting the output of the last stage of the amplifier to its line section, said filter section having means providing an impedance match between the plate line of said output stage and said line section at the high-frequency end of said restricted band, said matching section comprising two series condensers and a variable inductor connected from a point between said condensers to ground, and an adjustable L–C circuit in parallel with said condensers, said last circuit comprising a condenser and a variable inductor in series.

7. The invention according to claim 6, and an impedance matching network connected to the input of the amplifier for matching its input characteristic to that of a preceding line section.

8. The invention according to claim 7, and a line voltage compensator for said amplifier comprising a conventional power supply having an input transformer, a full-wave rectifier and filter for supplying B voltages to the tubes of said amplifier, the return circuit of said power supply being grounded through a variable resistor, a bypass condenser across said resistor, a voltage regulating device for maintaining the screen grid voltage constant, the control grid circuit of each stage being connected to said return circuit through its terminating resistor, whereby the control grid bias is varied to automatically compensate for variations in line voltage.

References Cited in the file of this patent

UNITED STATES PATENTS

| | | |
|---|---|---|
| 2,593,948 | Wiegand et al. | Apr. 22, 1952 |
| 2,670,408 | Kelley | Feb. 23, 1954 |

OTHER REFERENCES

Publication—"Distributed Amplification," by Ginzten et al., Proceedings of the Institute of Radio Engineers, vol. 36, No. 8, August 1948, pages 956–969; 179–171(25).

Publication—"Short Pulse Amplifiers," Electronics, vol. 25, No. 1 published January 1952, pages 128–131, 179–171(25).